Figure 1:
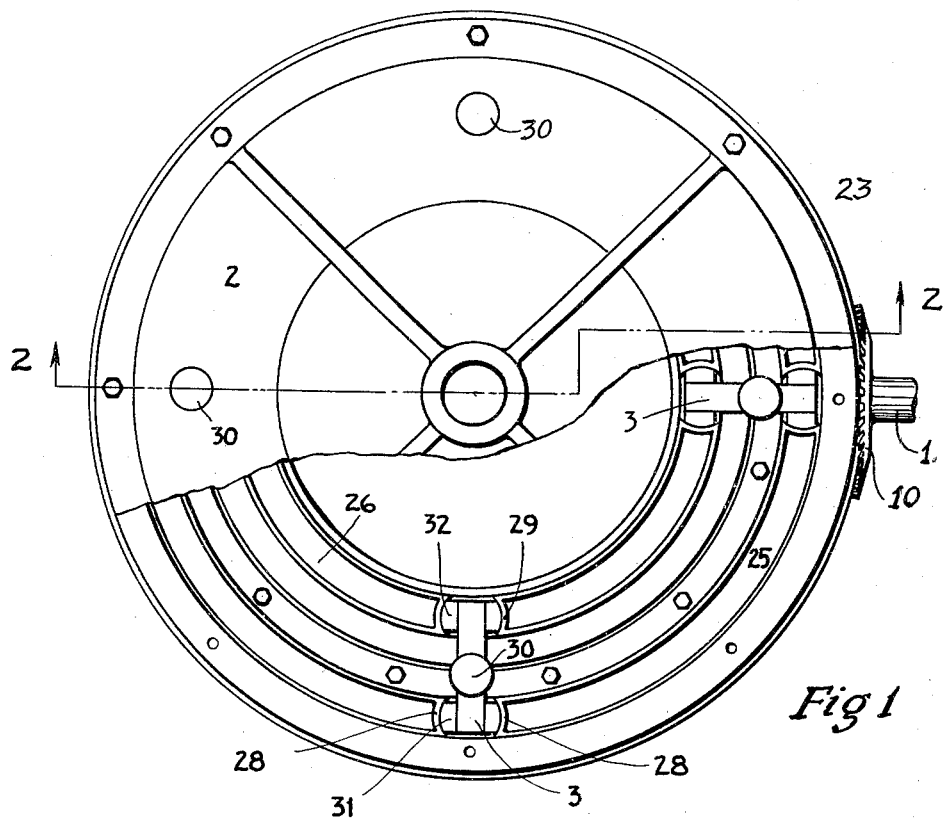

April 8, 1947. K. F. J. KIRSTEN 2,418,555
MULTIPLEX BEVEL GEARING
Filed April 7, 1945 2 Sheets-Sheet 1

Inventor
Kurt F. J. Kirsten
By Reynolds & Beach
Attorneys

April 8, 1947. K. F. J. KIRSTEN 2,418,555
MULTIPLEX BEVEL GEARING
Filed April 7, 1945 2 Sheets-Sheet 2
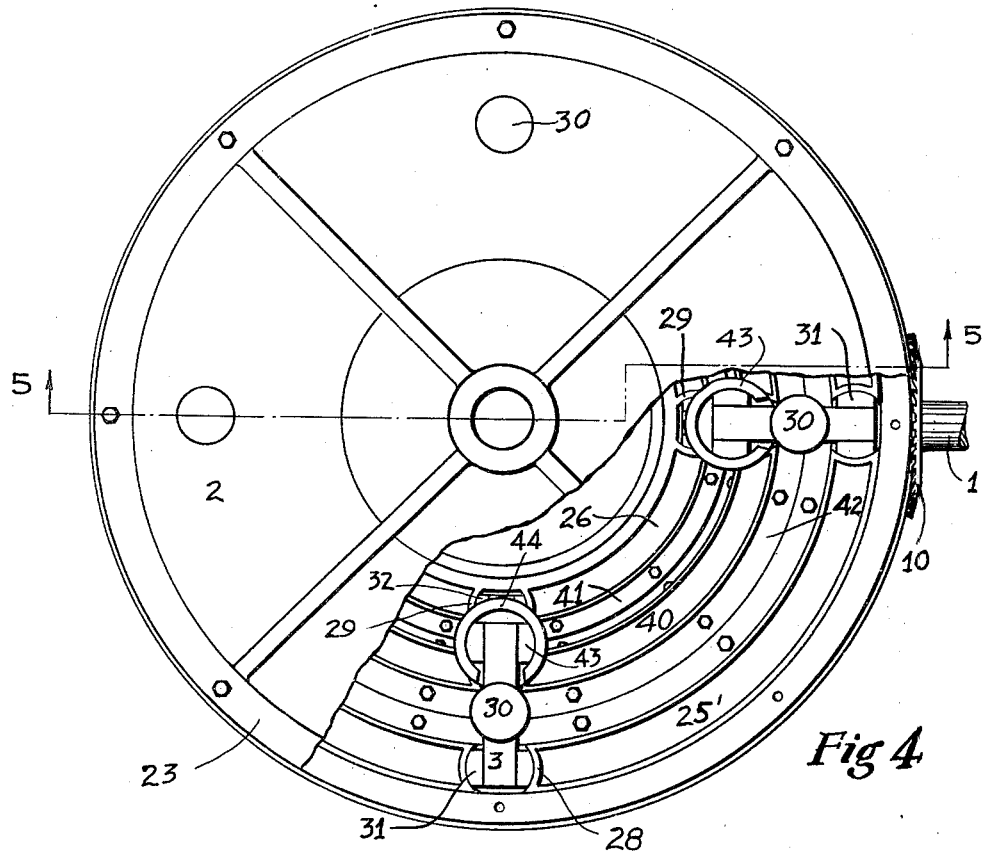
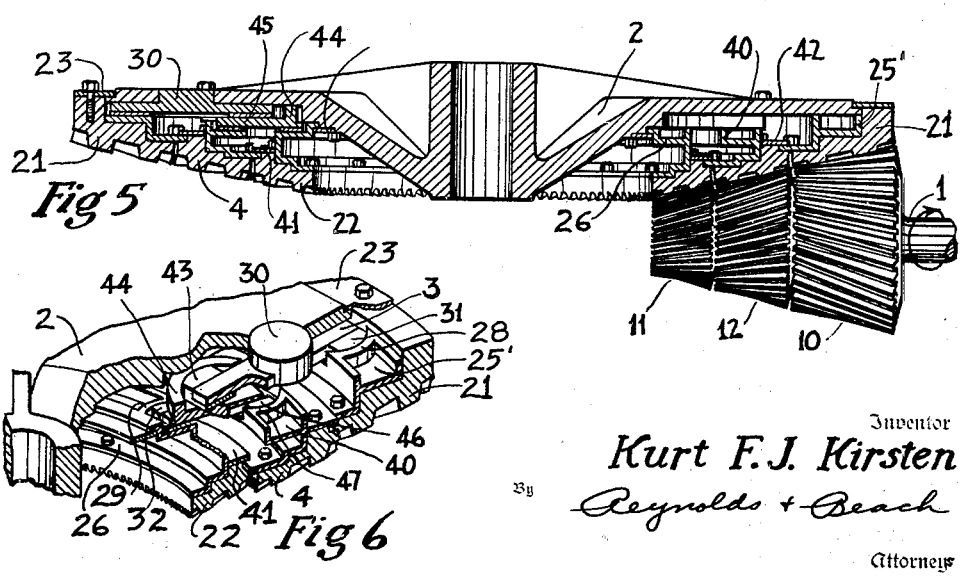
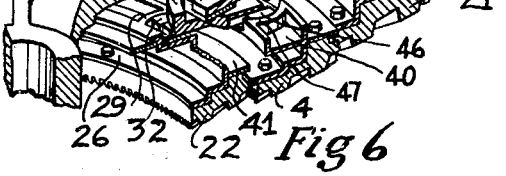
Inventor
Kurt F. J. Kirsten
Reynolds + Beach
Attorneys Patented Apr. 8, 1947

2,418,555

UNITED STATES PATENT OFFICE 2,418,555

MULTIPLEX BEVEL GEARING

Kurt F. J. Kirsten, Seattle, Wash.

Application April 7, 1945, Serial No. 587,093

13 Claims. (Cl. 74—410)

Bevel gear trains are commonly used to interconnect a drive shaft and a driven shaft disposed at an angle relative to each other, such as in mutually perpendicular arrangement. Frequently a cone angle other than 45 degrees is used so that one shaft, carrying a relatively large bevel gear, will rotate at a speed much slower than that at which the other shaft, carrying a relatively small bevel gear in mesh with the large gear, rotates. Particularly where the speed ratio between the two shafts is rather large, such as 6 to 1 or 6½ to 1, for example, it may be necessary for the larger gear to be of great size to be sufficiently strong to transmit the power or torque required.

Ordinarily the factor limiting the power or torque which can be transmitted with a given gear is the tooth pressure which the material of the gear is able to withstand. This tooth pressure is approximately the same whether the gear teeth be of the straight type or of the spiral type. The unit tooth pressure cannot be decreased practically merely by increasing the radial extent of the tooth indefinitely. A tooth of involute shape which extends radially, or substantially so, should not be made too long because of the great difference in tooth profile dimensions between the radially inner and outer ends of a tooth of excessive length. Also the alignment of a long gear tooth to maintain approximately uniform tooth pressure over its entire length is more critical.

In designing the teeth of spiral bevel gears not only must the tooth profile be considered, but also the spiral angle of the teeth relative to the radial planes of the gear passing through such respective teeth must ordinarily not be so great as to cause the component of the tooth pressure acting parallel to each such plane to exert too great an endwise thrust on the pinion shaft.

As a result of taking all these factors into account, good tooth design practice dictates that the radial extent of a tooth should not appreciably exceed one quarter of the pitch cone's slant height. With such a limitation as to length of the gear teeth, and the further requirement of a high speed ratio of the shafts, such as 6 to 1, the diameter of the larger gear required for transmission of a given power or torque is excessive.

It is a principal object of my invention to provide bevel gearing for interconnecting a driving shaft and a driven shaft which will be much more compact than conventional bevel gearing having an equivalent load-carrying capacity.

It is a further object to provide bevel gearing of the spiral tooth type which will exert little or no endwise thrust on the pinion shaft.

More specifically, such objects may be accomplished by employing multiplex gearing, such as duplex or triplex gearing, incorporating multiple pinion and gear sets in which a plurality of concentric pinions will mesh respectively with a plurality of complemental concentric gears. If the teeth are of the spiral type the end thrust on the pinion shaft may be eliminated by inclining spirally the teeth of one pinion and gear set so that the radially inner end of each tooth leads the radially outer end of such tooth, whereas on another pinion and gear set the radially outer end of each tooth will lead the radially inner end of the same tooth. The components of the tooth pressure acting on the teeth of the pinions in these two sets parallel to the pinion shaft will thus be opposed so that one will offset, or near offset, the other, resulting in little or no net endwise thrust on such shaft.

In such mechanism, incorporating a plurality of concentric pinion and gear sets, the number of teeth for the pinion of each set may be selected so that the impacts of the teeth in one pinion and gear set will be staggered with relation to the impacts of the teeth in another pinion and gear set, thus reducing the noise of such a gear drive. For this purpose the numbers of teeth on the pinions should have a common factor as small as possible. If the teeth are of the spiral bevel type the noise will be decreased further.

Since the over-all size of a multiple bevel gear combination incorporating my invention is exceptionally small, a multiplex gear train of a given over-all size is capable of transmitting considerably more power than a conventional bevel gear drive, including only a single gear and pinion, having the same over-all dimensions.

In the utilization of a plurality of sets of bevel gears arranged concentrically of the driving and driven shafts, respectively, it is a major object of my invention to distribute the loads between these gear sets so that the tooth pressure in all the sets will be virtually identical at all times. This object is accomplished without the necessity of unusually precise technique in cutting the gears, but the unit load between the meshing teeth of each gear and pinion set is substantially equal to the unit load between the meshing teeth of the other sets.

In the drawings I have illustrated one form of device capable of achieving the aforementioned objects. Such mechanism will have various applications and may be modified drastically both in the design of the individual parts and in their arrangement, while operating on the same principle.

Figure 2:
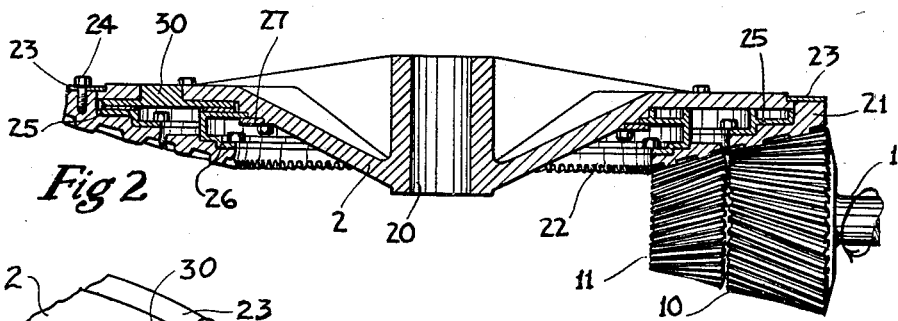
Figure 3:
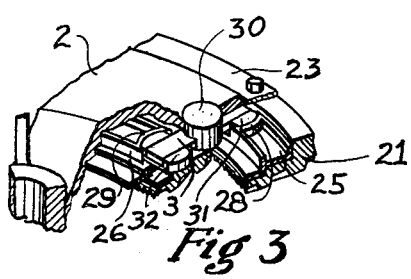

Figure 1 is a plan view of duplex gearing, with parts broken away. Figure 2 is a transverse sectional view through the gear mechanism, taken on line 2—2 of Figure 1. Figure 3 is a fragmentary top perspective view, with parts broken away to show the details of a coupling unit interconnecting two gear sections.

Figure 4 is a plan view of a triplex bevel gear assembly, parts of which are broken away. Figure 5 is a transverse sectional view through the gear mechanism of Figure 4, taken along line 5—5 of that figure. Figure 6 is a fragmentary top perspective view, with parts broken away to show the details, of a double coupling unit interconnecting three gear sections.

Although in the drawings only two representative forms of my multiplex bevel gearing have been shown, namely those of the duplex and triplex types, it will be understood that the technique of their design, which will be discussed in detail hereafter, can be followed in the design of multiplex bevel gearing incorporating any desired number of concentric pinions and respectively cooperating concentric gears.

The duplex bevel gearing mechanism illustrated in Figures 1 to 3, inclusive, includes a drive shaft 1 which carries an outer pinion 10 and an inner pinion 11 in concentric relationship. These pinions may be formed integrally from a single blank on which the two sets of pinion teeth are cut independently, leaving a slight space between them. Alternatively the pinions may be cut from separate blanks which are thereafter secured together in coaxial relationship with the shaft 1 in any suitable manner.

To complete the bevel gear train a mounting plate 2 having radial stiffening ribs is arranged with the axis of its bore 20 disposed at an angle to pinion shaft 1, in most instances perpendicular to it, although, if desired, the plate and shaft may be arranged at any selected angle. This mounting plate carries an outer bevel gear ring 21 meshing with the pinion 10, and an inner bevel gear ring 22 meshing with the pinion 11.

The drive ratio between the pinions and the gear rings will determine both the proper cone angle and the ratio of the number of gear teeth to the number of pinion teeth. The number of teeth provided on each of the pinions 10 and 11 will be selected so that they will be of suitable size. Ordinarily pinion 10 will have somewhat more teeth than pinion 11, so that the teeth on the two gearing sets will have approximately equal average cross sections and load-carrying ability. In order to reduce as far as possible the occurrence of cumulative impacts between the teeth of the two gear sets the numbers of teeth on the pinions 10 and 11 should be selected so that they have the lowest possible common factor.

By selecting a tooth length generally radially of pinions 10 and 11 and of gear rings 21 and 22 not exceeding one-quarter of the slant height of the pitch cone, a substantially true profile may be preserved throughout the length of each tooth. Also because the teeth are rather short their accurate alignment radially of the respective gears throughout their entire length is assured. The teeth on pinion 10, however, will be longer than the teeth on pinion 11 if their proportions relative to the slant heights of their respective cone angles is the same. Substantially uniform unit pressure at all points of contact between the gear and pinion teeth of both sets is obtained by the gear mounting structure described hereafter.

For some installations the teeth of both gear sets may be of the straight bevel type. Frequently, however, the desire for smoothness of operation, quietness, and distribution of the load simultaneously over more meshing teeth will favor spiral teeth. A principal disadvantage in the use heretofore of spiral teeth for bevel gearing has been the additional end thrust produced on the pinion shaft bearings. My multiplex gearing may be designed to eliminate such end thrust by directing the spiral of the teeth on the pinion and gear set 10, 21 in the opposite direction from that of the spiral of the teeth on pinion and gear set 11, 22, as shown in Figure 2.

Assuming that the pinion shaft 1, rotating in the direction indicated by the arrow, is driving the gearing, the inner ends of the teeth on pinion and gear set 10, 21 will lead the outer ends of these teeth in the direction of rotation, whereas the outer ends of the teeth on pinion and gear set 11, 22 will lead in the direction of rotation. Although the total pressure between the teeth of pinion 10 and gear 21 will be greater than the total pressure between the teeth of pinion 11 and gear 22, because of the difference in length of such teeth, the reaction axially of shaft 1 can be balanced exactly if the teeth on pinion 11 and gear 22 are inclined correspondingly more than the teeth on pinion 10 and gear 21. The relative degrees of inclination can be determined sufficiently accurately so that the resultant endwise thrust on shaft 1 will be negligible, if any.

Because a relatively short tooth can be employed in my multiplex gearing the teeth of each gear can be ground more accurately both in profile and in lengthwise direction. Theoretically it should be possible to cut gear rings 21 and 22 on a single blank so that they would form an integral structure, just as pinions 10 and 11 are illustrated. Despite the facility with which such short gear teeth may be cut, however, as compared with longer teeth, it would be virtually impossible to cut or grind separately the teeth on both gears, as well as on both pinions, sufficiently accurately relative to each other, especially when the number of teeth on the two sets varies, so that the teeth of both gear rings would be coordinated exactly with the teeth of both pinions at the same time.

In order to afford uniform concentration of the load along the teeth of all the pinion and gear sets, therefore, whether there be two or more such sets, I mount at least one element of the gearing adjustably relative to another gearing element. In the particular duplex arrangement which I have selected for illustration an element of each pinion and gear set is supported yieldably by its mounting element for adjustment relative to it. While both pinions are mounted rigidly on the pinion shaft, so that no relative rotational movement between them can occur, the gears meshing with them are capable of slight rotational adjustment relative to mounting plate 2 and to each other, to coordinate their coaction with their respective pinions. After their relationship to each other has been established initially to equalize the unit pressure between the elements of the gearing set no further movement will occur, and the gear rings and their assembly will thereafter function as a unit.

In the particular structure illustrated relative circumferential adjustment of gear rings 21 and 22, so that the load will be properly distributed between them, is effected by providing a ring mounting between at least one of the gear rings and the supporting plate 2. Preferably both gear rings are rotatively adjustable relative to the mounting plate, so that circumferential shifting of one gear ring will be accompanied by compensative circumferential shifting of the other gear ring in the opposite direction.

Gear ring 21 has a retaining ring 23 received in a peripheral recess in the gear mounting and secured by bolts 24 to the gear ring. The radially inner portion of this gear ring has secured to it a ribbed bearing ring 25 which bears against the underside of the mounting plate 2. The inner gear ring 22 may have a single supporting ring 26 secured to it which also bears against the underside of the mounting plate, and has an inwardly directed edge held in place by a retaining ring 27, which is bolted to the mounting plate.

The structure described guides both gear rings 21 and 22 for shifting circumferentially relative to the mounting plate 2, independently of each other, while having adequate bearing engagement with such plate in all adjusted positions. If these gear rings were not restrained from rotation relative to the mounting plate in some fashion they would merely slide around such plate, instead of rotating it, when driven by pinions 10 and 11. I therefore provide connecting mechanism between the gear rings and their support which not only positively interconnects these elements, but also coordinates circumferential shifting of the two gear rings relative to the mounting plate and to each other, for the purpose of distributing and balancing the load between the gear rings so that the tooth pressure between the teeth of both pinion and gear sets will be uniform.

Such gear ring connecting structure includes one or more balancing lever bars 3, four such bars equally spaced apart at angles of 90 degrees being illustrated. Each of these bars has a boss 30 upstanding generally centrally from it and journaled in an aperture in the mounting plate 2. Even though more than one of such bars are provided each bar and its boss should be designed so that it will have sufficient strength to transmit the entire load from both ring gears to the mounting plate.

Each end of each balancing lever 3 is slidably received in a guide channel or recess extending diametrically of a rotatable journal block. Thus the outer end of each such lever slides in a groove in the upper side of a journal block 31 rotatively retained by arcuate ribs 28 formed on the upper side of bearing ring 25 of gear 21. The inner end of each bar 3 is similarly slidably received in a grooved journal block 32 rotatively held by arcuate ribs 29 upstanding from bearing ring 26 secured to the inner gear ring 22.

It will be noted that the boss 30 on each balancing lever 3 is located somewhat closer to the outer end of such lever than to its inner end. Because, in the instance selected for illustration, where both gear rings have a radial extent equal to the same proportion of the slant height of their respective cones, both the radial width and the diameter of the outer gear ring 21 are greater than the corresponding dimensions of the inner gear ring 22, the former gear ring will transmit more power than the latter gear ring, if the pressure on a unit tooth length of both gear rings is the same. In any event the relative power transmitted by the respective gear rings will depend upon their radial extent, their mean radius from the axis of the gears' rotation, and the pressure between the teeth of the meshing gears. The axis of each boss 30 may be located so that for any given gear arrangement and location of the journal blocks for the different gears the torque about such boss will be balanced when the load is equally distributed along the gear teeth.

The distance of each boss 30 from the axis of the gears' rotation which will be required to maintain uniform loading along the teeth of both ring gears, when the journal block for each gear is located radially centrally of the contact zone of the gear teeth, may be calculated by the following equation:

$$R_B = \frac{P_O R_O + P_I R_I}{P_O + P_I}$$

where $P_O$ is the total pressure on the outer gear ring, calculated by multiplying its effective radial width by the pressure on a unit tooth length;

$P_I$ is the total pressure on the inner gear ring, calculated by multiplying its effective radial width by the pressure on a unit tooth length;

$R_B$ is the distance between the gears' rotative axis and the axis of boss 30;

$R_O$ is the radial distance between the gears' rotative axis and the center of the outer gear's contact zone; and $R_I$ is the radial distance between the gears' rotative axis and the center of the inner gear's contact zone.

While in most cases it will probably be desirable for the axes of journal blocks 31 and 32 to coincide with the center of the outer and inner gears' contact zones, respectively, such disposition is not necessary. In other instances the denominator of the above equation must be corrected for the journal locations thus:

$$R_O = \frac{P_O R_O + P_I R_I}{\frac{P_O R_O}{R_{OJ}} + \frac{P_I R_I}{R_{IJ}}}$$

where $R_{OJ}$ is the radial distance to the axis of journal block 31, and $R_{IJ}$ is the radial distance to the axis of journal block 32. The latter equation is the general form because the former equation results where $R_{OJ}$ equal $R_O$ and $R_{IJ}$ equal $R_I$. Only if the appropriate one of these equations is satisfied will the unit pressure on the teeth of both gears be the same. If boss 30 should be located radially outward somewhat farther than the distance thus calculated the tooth loading on the outer gear will be somewhat greater than that on the inner gear, and the converse will be true if the boss is shifted radially inward to some extent.

For some installations it may be desired to use finer teeth on an inner gear than on an outer gear, and in those cases it may be preferable for the unit loading on the teeth of the outer gear to be greater than that on the teeth of the inner gear. The equations above may still be used satisfactorily to determine the location of the center of boss 30 in this instance by using the appropriate different values of unit pressure in calculating the factors $P_O$ and $P_I$.

If the length of each tooth is one-quarter of the slant height of its pitch cone, and the outer diameter of the inner gear is 75% of the outer diameter of the outer gear, as illustrated in the drawing, the length of the teeth on the inner gear will be three-sixteenths of the slant height of the outer gear's pitch cone. The aggregate length of the teeth in pinions 10 and 11, and in gears 21 and 22, will therefore be approximately 44% of the slant height of the outer gear's pitch cone, without allowing for slight clearance between the gear rings. Much greater power can be transmitted through my duplex gear mechanism of given over-all diameter than through bevel gearing of the conventional type for this reason.

As pointed out above, the power which can be transmitted by a particular gear arrangement depends upon the effective length of tooth and the distance between the location at which the pressure of the gear is effective and the rotative axis of the gear set or the apex of the pitch cone. In terms of a given over-all radius, therefore, assuming the total pressure to act centrally of the individual gear widths, and hence centrally of the aggregate gear width, and that the pressure on a unit tooth length of both gears is the same, the duplex bevel gear train described could transmit in excess of 50% more power than a single gear having the same maximum diameter and a tooth length of 25% of the slant height of its pitch cone. This result may be obtained by solving the first equation for $(R_B)$ $(P_O+P_I)$, or multiplying the aggregate tooth length by the distance between the center of such length and the axis of the gears' rotation, if there is negligible clearance between the teeth, and comparing such result with the tooth length of the outer gear alone multiplied by its average radius. A given power could be transmitted by such a duplex gear train having an outer diameter slightly more than 80% of the diameter of a comparable single bevel gear set.

If shaft 1 is rotated to drive pinions 10 and 11 their initial pressure on gear rings 21 and 22 may be unequal. In such event the gear placing the greater moment on the bosses 30 will be slid slightly circumferentially relative to mounting plate 2 in the direction opposite to the direction of rotation of the mounting plate. By such movement levers 3 will be swung about the axes of bosses 30 to shift the other gear ring simultaneously circumferentially relative to mounting plate 2 in the direction of rotation of such plate to an extent corresponding to the difference in lever arms of the balancing bars. If bosses 30 have been located accurately according to the above equation the bars will shift until the unit pressures on the teeth of the two gear rings are equalized. In such stable equilibrium position each bar may be slightly inclined to the radius, but such inclination will be negligible if the gears and pinions of both sets are substantially in contact initially, and in any event such inclination will be immaterial.

If the bosses on the balancing bars are not located exactly accurately radially in their mounting the unit pressure on the teeth of one gear will be slightly greater than that on the teeth of the other gear. If the bosses of the several bars are not exactly equally spaced circumferentially of plate 2 the load will not be shared equally between them. In most instances, because of manufacturing tolerances, a greater load will be carried by one of these levers than by another. For that reason, as previously stated, each lever system should be designed so that it can carry the entire load on the gearing. In such an extreme case all the load can be transmitted from the teeth of the gear rings in mesh with the pinions, through backing rings 25 and 26, to any single balancing lever.

The greater the effective radial length of the teeth of a gear train the greater will be the power which can be transmitted for bevel gearing of a given over-all size. It is quite impractical, however, to increase the length of the teeth on a single bevel gear to equal the aggregate length of the teeth in my duplex gearing described, namely 44% of its pitch cone's slant height, because of the difficulty of producing accurate tooth contour at the ends of the teeth and correct tooth direction. On the contrary the tooth shape in my gearing is quite true because of the relatively short length of the individual teeth. If the gearing is divided into three pinion and gear sets, each gear still having a tooth length one-quarter of its pitch cone's slant height, the aggregate length of the teeth will be even greater than in my duplex gearing, namely about 58% of the slant height of the outer gear set, disregarding the slight clearance between adjacent gears.

Such triplex gear mechanism is illustrated in Figures 4 to 6, inclusive. The structure of this assembly may be substantially the same as that described above, except for the insertion of an intermediate pinion section 12 between pinion sections 10 and 11 to mesh with an intermediate ring gear 4. While the inner and outer ring gears will be mounted on the ribbed mounting plate 2 in the manner previously described in connection with the duplex gearing of Figures 1 to 3 inclusive, the intermediate gear may be supported from the inner and outer gears. A backing ring 40, having a central ribbed portion arranged to bear against the underside of plate 2, may have an inner edge projecting beyond the inner periphery of its gear ring to fit in an annular recess formed in the outer edge of the inner gear ring 22, as shown in Figure 5. A plate 41 bolted or otherwise removably secured to the inner gear ring may retain the inner edge of ring 40 in such recess.

The backing ring 25' for the outer gear ring 21 may be modified from the form shown in Figures 1 and 2 so that its inner edge projects inward slightly beyond the inner edge of such gear ring to fit in a recess formed in the outer periphery of gear ring 4 similar to that provided in the periphery of gear ring 22. A ring 42 bolted or similarly attached to the upper side of gear ring 4 may retain the edge of ring 25' in such gear recess. The three gear rings may thus be assembled with their backing rings and securing rings before this assembly is attached to the mounting plate 2.

In order to effect a yieldable driving connection between the three ring gears 21, 22 and 4, a double lever or balancing bar system, as shown in Figure 6, may be provided. The outer end of each lever 3 may be received slidably in a journal block 31 carried by ring 25' as described in connection with the duplex gear arrangement. The inner end of this lever, however, will slide in a journal block 43 which is rotatable in a recess formed in boss 44 carried by a second lever 45. The inner end of this second lever is slidably received in journal block 32 rotatably mounted in backing ring 26 on gear ring 22, just as in the duplex gearing. The outer end of lever 45 is similarly slidably received in a journal block 46, rotatively held by a flange 47 in backing ring 40 mounted on gear ring 4.

It will be seen that by this arrangement the loads on gear rings 4 and 22 are balanced against each other through the balancing levers 45, whereas the combined loads on these two gears is balanced against the load on the outer gear 21 alone. The location of the axis of each retaining rib 44 will be selected with respect to the length of the lever 45 in the manner previously discussed for calculating the location of boss 30 on lever 3 of the duplex gearing. The location of the axis for boss 30 in the triplex gearing will be determined by solving again the appropriate one of the equations given, considering the entire pressure of gears 4 and 22, which is transmitted through the axis of journal block 43, as $P_I$, and the value of $R_B$ for levers 45 as $R_{IJ}$. $R_I$ would be the average radius of gears 21 and 22 considered together. Since the entire power of gear 21 is transmitted only through the axis of journal block 31, the pressure of this gear alone would be $P_O$, and the eccentricity of its journal block 31 from the center of the gears' rotation will be $R_{OJ}$. Although the combined lengths of the teeth on gears 4 and 22 is about 33% of the slant height of the outer gears' pitch cone, whereas the length of the teeth on the latter gear are only 25% of such slant height, the power produced by the outer gear will be greater than the aggregate power transmitted by the inner two gears combined, because of the greater effective radius of the outer gear.

With the tooth proportionate lengths selected and equal unit pressures on the meshing teeth of all the gears, the outer gear would produce approximately 14% more torque than the inner two gears together. Consequently the boss 30 of the main balancing bar would still be closer to the axis of journal block 31 than to the axis of journal block 43, concentric with the boss of the subordinate lever 45, if the journal block for each gear is located centrally of the effective width of its gear. The torque produced, or the power transmitted, by the triplex gearing as a whole would be approximately 88% more than the torque and power for a single set of bevel gears having a tooth length a quarter of the slant height of its pitch cone, an equal outer diameter and equal unit pressure on the meshing teeth.

Expressed differently, the power which could be transmitted by a single gear train having teeth of the proportions mentioned, for a given unit load, could be transmitted by a triplex gear train of the type described having an outer diameter only approximately 73% as great as would be required for an equivalent single set of bevel gears with no higher unit tooth pressure. The increased load-carrying ability of a gear train having still a greater number of pinion and gear sets would even further increase the power which could be safely transmitted by a gear train of given over-all diameter. The compactness of my multiplex gearing is therefore one of its principal advantages.

A further characteristic of my multiplex gearing is the timing of the cumulative tooth impacts. Each tooth of a multiplex gearing train will carry a lighter load than a tooth of a gear in a single set of bevel gears required to carry the same total load. The tooth impacts will therefore not be as loud except where the teeth of two or more pinions engage their corresponding gear teeth at the same instant. If the pinions do not have a common factor greater than one, such coincident impacts will occur only once during each revolution of the pinion shaft. If the pinion shaft is rotated at a speed even as high as 900 R. P. M., or 15 revolutions per second, coincident impacts of both pinions would occur only 15 times every second, which is the lowest audible frequency. In such case, if the speed of the pinion shaft did not appreciably exceed 900 R. P. M., my duplex gear drive would be quieter than a single set bevel gear train of comparable capacity and having teeth of a similar type.

If the drive ratio between the pinions and the gears is a whole number the teeth of the pinions in a duplex bevel gear drive need not have a common factor higher than one. Where such drive ratio is an improper fraction, however, the pinions of the duplex gearing must have a common factor greater than one, namely a common factor equal to the denominator of such fraction. Consequently, in such cases, the teeth of the pinions in a duplex bevel gear train will have a number of coincident impacts during each revolution equal to such common factor, or drive ratio improper fraction denominator.

In a triplex drive the drive ratio determines the frequency with which tooth impacts of all three of the pinions coincide. In some instances tooth impacts of two pinions may coincide more frequently than the impacts of all three pinions, but, because of the division of the load into portions for each tooth smaller than in a single bevel gear set, only the coincident impacts of teeth on all three of the pinions are of particular significance.

As previously mentioned, quietness of operation is improved by utilizing spiral teeth. In the triplex gearing, as stated, the pressure between pinion 10 and gear 21 will be somewhat less than the combined pressure between pinions 11 and 12 and gears 22 and 4. Consequently if the teeth are of the spiral type those on the outer pinion and gear may be inclined to a slightly lesser degree than the teeth on pinions 11 and 12 and on gears 22 and 4. The degree of inclination of the teeth on these latter two pinions and gears may be equal.

I claim as my invention:

1. Multiplex bevel gearing comprising two members rotative about axes disposed angularly relative to each other, a plurality of bevel gears carried by each of said rotative members, said bevel gears carried by one of said rotative members meshing respectively with the bevel gears carried by the other of said rotative members, and self-shiftable, nonresilient means interposed between one of said rotative members and at least one of said bevel gears carried thereby, operable to enable shifting of such bevel gear relative to its rotative member to effect driving contact of such shiftable gear with its cooperating gear at the same time that other cooperating bevel gears carried by said two rotative members, respectively, are in driving contact, and said means further being operable to transmit between such shiftable gear and its rotative member force corresponding to the load on such adjustable gear produced by a unit pressure on the teeth thereof substantially equal to the average unit pressure on the teeth of all said gears.

2. Multiplex bevel gearing comprising two members rotative about axes disposed angularly relative to each other, a plurality of bevel gears carried by each of said rotative members, said bevel gears carried by one of said rotative members meshing respectively with the bevel gears carried by the other of said rotative members, and yieldable means interposed between one of said rotative members and at least one of said bevel gears carried thereby, guiding such bevel gear for circumferential shifting relative to its rotative members to effect driving contact of such shiftable gear with its cooperating gear at the same time that other cooperating bevel gears carried by said two rotative members, respectively, are in driving contact, and said means further being operable to transmit between such shiftable gear and its rotative member force corresponding to the load on such shiftable gear produced by a unit pressure on the teeth thereof substantially equal to the average unit pressure on the teeth of all said gears.

3. Multiplex bevel gearing comprising a plurality of sets of bevel gears, corresponding gears of said sets being adapted to be disposed in coaxial relationship to form two coaxial gear groups, first rotative means supporting and rigidly connecting for conjoint rotation all the gears of a first group of said coaxial gears, second rotative means rotative about an axis at an angle to the axis of rotation of said first rotative means and supporting all the gears of a second group of said coaxial gears, and means supporting the gears in the second of said coaxial gear groups for conjoint shifting relative to said second rotative means supporting such second gear group to coordinate the meshing of the gears in different gear sets.

4. Multiplex bevel gearing comprising two sets of bevel gears, corresponding gears of said two sets being adapted to be disposed in coaxial relationship to form two coaxial gear groups, rotative means supporting and rigidly connecting for conjoint rotation the two gears of one of said coaxial gear groups, means rotative about an axis at an angle to the axis of rotation of said first rotative means and supporting the two gears of the other of said coaxial gear groups, and balancing means interconnecting the gears of one of said coaxial gear groups, and mounting them yieldably relative to the rotative means supporting such gear group for circumferential shifting to coordinate the meshing of the gears in different gear sets.

5. Multiplex bevel gearing comprising a plurality of sets of bevel gears, corresponding gears of said sets being adapted to be disposed in coaxial relationship to form two coaxial gear groups, rotative means supporting and rigidly connecting for conjoint rotation the gears of one of said coaxial gear groups, means rotative about an axis at an angle to the axis of rotation of said first rotative means and supporting the gears of the other of said coaxial gear groups, balancing lever means, pivot means connecting said lever means to one of said rotative means for swinging about an axis generally parallel to the rotative axis of such rotative means, and means connecting said lever means to at least two gears in the coaxial gear group supported by such lever-connected rotative means, to guide such lever-connected gears for simultaneous circumferential shifting to coordinate the meshing of such lever-connected gears with the other gears of their gear sets.

6. The multiplex bevel gearing defined in claim 5, in which the balancing lever means includes at least two lever bars, one of such bars interconnecting two adjacent gears of a coaxial gear group and the other bar interconnecting said first bar and a gear in the same coaxial gear group of larger diameter than either of the gears connected by said first lever bar.

7. Multiplex bevel gearing comprising two sets of bevel gears, corresponding gears of said two sets being adapted to be disposed in coaxial relationship to form two coaxial gear groups, rotative means supporting and rigidly connecting for conjoint rotation the two gears of one of said coaxial gear groups, means rotative about an axis at an angle to the axis of rotation of said first rotative means and supporting the two gears of the other of said coaxial gear groups, a balancing lever bar, pivot means disposed generally centrally of said bar and connecting it to one of said rotative means for swinging about an axis generally parallel to the rotative axis of such rotative means, and means connecting each end of said bar to a different gear in the coaxial gear group supported by such bar-connected rotative means, and yieldable for relative movement of such gears and said lever both lengthwise of the lever and rotatively about an axis generally parallel to the axis of said bar-connected rotative means, to guide such bar-connected gears for simultaneous circumferential shifting in opposite directions relative to the bar-connected rotative means to coordinate the meshing of such bar-connected gears with the other gears of their gear sets.

8. In multiplex bevel gearing, a member rotative above an axis, a plurality of bevel gears supported by said rotative member coaxially therewith, at least two of such gears being circumferentially shiftable relative to said rotative member, and means interconnecting said shiftable bevel gears and said rotative member and operable to coordinate the relative shifting of such gears circumferentially of said rotative member, and to transmit to said rotative member the combined force exerted on the teeth of both of said gears.

9. Multiplex bevel gearing comprising a plurality of sets of spiral bevel gears, two means rotative about axes disposed angularly relative to each other and supporting corresponding gears of said sets in coaxial relationship to form two coaxial gear groups, the teeth of the gears in at least one gear set supported by said two rotative means being directed so that their radially outer ends lead in the respective directions of rotation of said rotative means, and the teeth of the gears of another of said sets supported by said two rotative means being directed so that simultaneously their radially inner ends lead in the respective directions of rotation of said rotative means, the total radial extent of the outer end leading gear teeth being different from the total radial extent of the inner end leading gear teeth, and the inclination from radial of such teeth having the lesser total radial extent being greater than the inclination from radial of such teeth having the greater total radial extent, thereby to balance the thrust forces on said rotative means generally parallel to their rotative axes produced by the spiral directions of the gear teeth.

10. Multiplex bevel gearing comprising two sets of spiral bevel gears, corresponding gears of said two sets being adapted to be disposed in coaxial relationship to form two coaxial gear groups, rotative means supporting and rigidly connecting for conjoint rotation the two gears of one of said coaxial gear groups, means rotative about an axis at an angle to the axis of rotation of said first rotative means and supporting the gears of the other of said coaxial gear groups, the teeth of the gears in one gear set supported by said two rotative means being directed so that their radially outer ends lead in the respective directions of rotation of said rotative means, and the teeth of the gears of another of said sets supported by said two rotative means being directed so that simultaneously their radially inner ends lead in the respective directions of rotation of said rotative means, thereby to balance the thrust forces on said rotative means generally parallel to their rotative axes produced by the spiral direction of the gear teeth, and balancing means interconnecting the gears of such other coaxial gear group, and securing them yieldably relative to the second rotative means, supporting such gear group, for circumferential shifting to coordinate the meshing of the gears in different gear sets.

11. Multiplex bevel gearing comprising two members rotative about axes disposed angularly relative to each other, two sets of spiral bevel gears, a gear of each set being carried by each of said rotative members, said bevel gears carried by one of said rotative members meshing respectively with the bevel gears carried by the other of said rotative members, the teeth of the meshing gears in one gear set being directed so that their radially outer ends lead in the respective directions of rotation of said two rotative members, and the teeth of the meshing gears of the other set being directed so that simultaneously their radially inner ends lead in the respective directions of rotation of said two rotative members, thereby to balance the thrust forces on said rotative members generally parallel to their rotative axes produced by the spiral direction of the gear teeth, and adjustable means interposed between one of said rotative members and at least one of said bevel gears carried thereby, operable to permit circumferential shifting of such bevel gear relative to its rotative member to effect contact of such shiftable gear with the other gear of its set at the same time that the bevel gears of the other set are in meshing contact.

12. Multiplex bevel gearing comprising a plurality of sets of bevel gears, corresponding gears of said sets being adapted to be disposed in coaxial relationship to form two coaxial gear groups, rotative means supporting and rigidly connecting for conjoint rotation all the gears of one of said coaxial gear groups, and means rotative about an axis at an angle to the axis of rotation of said first rotative means and supporting all the gears of the other of said coaxial gear groups, the numbers of teeth on the gears in each coaxial group having a common factor not greater than the smallest possible denominator of the improper fraction designating the drive ratio between the gears of each of said sets.

13. Multiplex gearing comprising two members rotative about axes disposed angularly relative to each other, a plurality of gears carried by each of said rotative members, said gears carried by one of said rotative members meshing respectively with the gears carried by the other of said rotative members, and means for at least one of said gears, operable to enable shifting of such gear relative to the gear meshing therewith while such meshing gears are rotating, to effect driving contact of such shiftable gear with such gear meshing therewith at the same time and under substantially the same unit tooth pressure as the unit tooth pressure between other meshing gears carried by said two rotative members, respectively, in driving contact.

KURT F. J. KIRSTEN.

REFERENCES CITED

The following references are of record in the file of this patent:

UNITED STATES PATENTS

| Number | Name | Date |
|---|---|---|
| 794,224 | Hill | July 11, 1905 |